United States Patent [19]

Miura

[11] Patent Number: 5,511,736
[45] Date of Patent: Apr. 30, 1996

[54] TAPE CASSETTE AND GUIDE PIN

[75] Inventor: Yoshinori Miura, Shiogama, Japan

[73] Assignees: Sony Corporation, Tokyo, Japan; Sony Electronics Inc., Park Ridge, N.J.

[21] Appl. No.: 262,205

[22] Filed: Jun. 20, 1994

[51] Int. Cl.⁶ ............................................. G11B 23/107
[52] U.S. Cl. ........................................... 242/346; 242/615
[58] Field of Search ................................. 242/346, 615; 360/132

[56] References Cited

U.S. PATENT DOCUMENTS

| | | |
|---|---|---|
| 4,198,013 | 4/1980 | Anglin et al. . |
| 4,231,532 | 11/1980 | Popov et al. ............................ 242/346 |
| 4,700,254 | 10/1987 | Oishi et al. ............................. 360/132 |
| 4,919,356 | 4/1990 | Nakagawa ............................... 242/346 |
| 4,920,439 | 4/1990 | Bordignon .......................... 242/346 X |
| 5,097,374 | 3/1992 | Koizumi et al. . |
| 5,104,058 | 4/1992 | Eggebeen ................................ 242/346 |
| 5,221,061 | 6/1993 | Nishioka et al. ........................ 242/346 |
| 5,333,806 | 8/1994 | Stanley et al. ...................... 242/346 X |
| 5,358,193 | 10/1994 | Madsen et al. ..................... 242/346 X |
| 5,377,928 | 1/1995 | Gelardi et al. ...................... 242/346 X |

*Primary Examiner*—Daniel P. Stodola
*Assistant Examiner*—William A. Rivera
*Attorney, Agent, or Firm*—Pasquale Musacchio; Jerry A. Miller

[57] ABSTRACT

A guide pin for use in a tape cassette. The guide pin includes a cylinder having a tape contact section, a press fit section and a slot extending through the tape contact and press fit sections. Upon compression of the press fit section, the press fit section may be inserted into an aperture of the tape cassette. After insertion, the guide pin is released and the resiliency of the press fit section moves the press fit section against the inner walls of the aperture to secure the guide pin to the tape cassette.

13 Claims, 8 Drawing Sheets

TAPE CASSETTE AND GUIDE PIN

FIELD OF THE INVENTION

The present invention relates to a tape cassette which is optimally adapted for use in recording and/or reproducing apparatus. Specifically, the invention is related to an improvement on a tape cassette wherein tape guide pins having a central slot are press fit into a cassette casing.

BACKGROUND OF THE INVENTION

Recently, there have been proposed and developed various magnetic tape cassettes to serve as a data storage medium.

One such magnetic tape cassette is disclosed in U.S. Pat. No. 4,198,013. This conventional tape cassette includes a supply reel and a take-up reel rotatably supported in a cassette casing. Typically, upstanding tape guide pins are utilized in such tape cassettes to define a tape path for the magnetic tape. The guide pins are affixed in predetermined locations in the cassette casing such that the tape is wound onto the reels at a predetermined contact angle.

Conventional guide pins for tape cassettes are disclosed in U.S. Pat. No. 5,097,374 entitled TAPE CASSETTE HAVING TAPERED GUIDE PINS PRESS-FITTED INTO CASSETTE WALL AND GREASE LUBRICANT FOR ROLLERS which issued on Mar. 17, 1992 to Koizumi et al. and is assigned to Sony Corporation. Referring to FIG. 1, a first configuration for a conventional guide pin 90 is shown. The tape cassette includes a lower cassette casing 92 shown as a partial cross section having a hole 104 which includes an inner periphery 110. The guide pin 90 includes a tape contact section 94 positioned between an upper flange section 96 and a lower flange section 98 having a bottom surface 102. The tape contact section 94 provides a contact surface upon which magnetic tape (not shown) passes over as the tape is advanced within the tape cassette. The upper 96 and lower flange 98 sections serve to restrict lateral movement of the tape as the tape passes over the tape contact section 94. A press-fit section 100 extends downwardly from the bottom surface 102. The tape contact 94, upper flange 96, lower flange 98 and press-fit 100 sections each have a constant outer diameter. The outer diameter of the press-fit section 100 is sized larger than the hole 104 so as to provide a press fit upon insertion of the press-fit section 100 into the hole 104. This causes pressure between the press-fit section 100 and inner periphery 110 which serves to affix the guide pin 90 to the cassette casing 92.

Referring to FIG. 2 in conjunction with FIG. 1, a partial view of a second configuration for a conventional guide pin 112 is shown. In this configuration, the guide pin 112 includes a press-fit section 114 having an outer diameter which gradually increases from the bottom surface 102 to an end 106 of the press-fit section 114 to form a reverse tapered outer periphery 108. As such, an outer diameter (a) near the bottom surface 102 is smaller than an outer diameter (b) at the end 106 of the press-fit section 114. Upon insertion of the press-fit section 114 within the hole 104, the hole 104 expands to accomodate the outer diameter (b) of the press-fit section 114. As a result, areas of the press fit section 114 having an outer diameter smaller than outer diameter (b) do not come in contact with the hole 104. Consequently, the entire outer periphery 108 of the press-fit section 114 is not in contact with the entire inner periphery 110 of the hole 104, thus decreasing the amount of pressure therebetween. This results in a relatively loose press-fit wherein the guide pin 112 may be easily removed. As such, vibration and other external forces may undesirably dislodge the guide pin 112 from the cassette casing 92.

Referring to FIG. 3, a third configuration for a conventional guide pin 116 is shown. In this configuration, the guide pin 116 includes a press-fit section 118 having an outer diameter which gradually decreases from the bottom surface 102 to the end 106 of the press-fit section 118 to form a frusto-conical or tapered outer periphery 118. As such, an outer diameter (A) near the bottom surface 102 is larger than an outer diameter (B) located a distance 1 from the outer diameter (B) near the end 106 of the press-fit section 118. It is desirable that the taper of the press-fit section 118, denoted by $(A-B)/(l)$, be selected within a range of ratios between 1/250 and 1/38. If the taper exceeds the maximum value, the flatness of the cassette casing 92 may not be maintained due to high stresses produced upon insertion of the press fit section 118 into the cassette casing 92. Alternately, if the taper is less than the minimum value, a sufficient press fit may not be achieved.

Furthermore, it is desirable that the dimensions of the press-fit sections are maintained within close tolerances to ensure a sufficient press fit. This requires high precision manufacturing techniques. Typically, a lathe is used to manufacture the conventional guide pins. However, the machining accuracy of a lathe is undesirably affected by various factors. These include deflection of the guide pin that occurs during machining, fluctuation in bite of the cutting tool utilized, inconsistent application of cutting lubricant on the guide pin and others. A further disadvantage is that maintaining a high degree of machining accuracy results in high manufacturing costs and is time consuming.

SUMMARY OF THE INVENTION

A guide pin for use in a tape cassette. The guide pin includes a cylinder having a tape contact section, a press fit section and a slot extending through the tape contact and press fit sections to form opposed resilient members in the press fit section. In a first position, the opposed members are separated by a first distance. The opposed members are moveable to a second position wherein the resilient members are separated by a second distance which is less than the first distance and the resilient members are biased to move toward the first position.

DESCRIPTION OF THE PREFERRED EMBODIMENT

Figure 1:
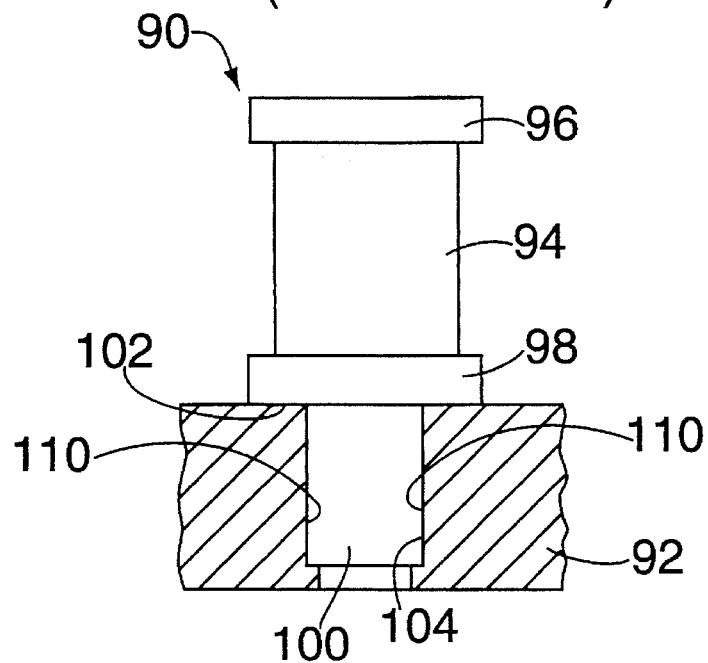
FIG. 1 depicts a prior art guide pin.
Figure 2:
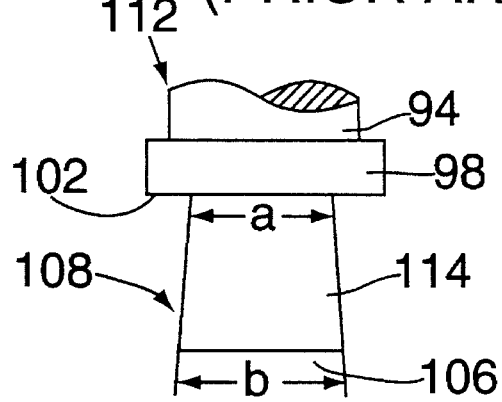
FIG. 2 depicts a prior art guide pin having a reverse taper press fit section.
Figure 3:
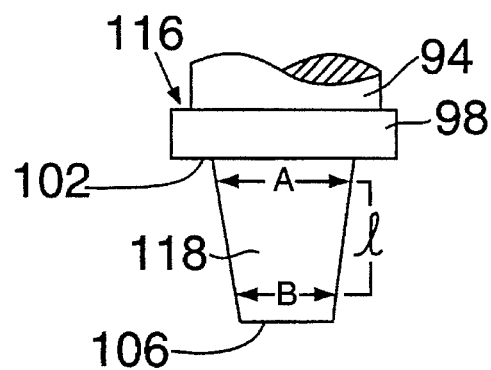
FIG. 3 depicts a prior art guide pin having a tapered press fit section.

The principles of the present invention will now be described by referring to the following description in conjunction with FIGS. 4–10, wherein like elements are designated by like reference numerals.

Figure 4:
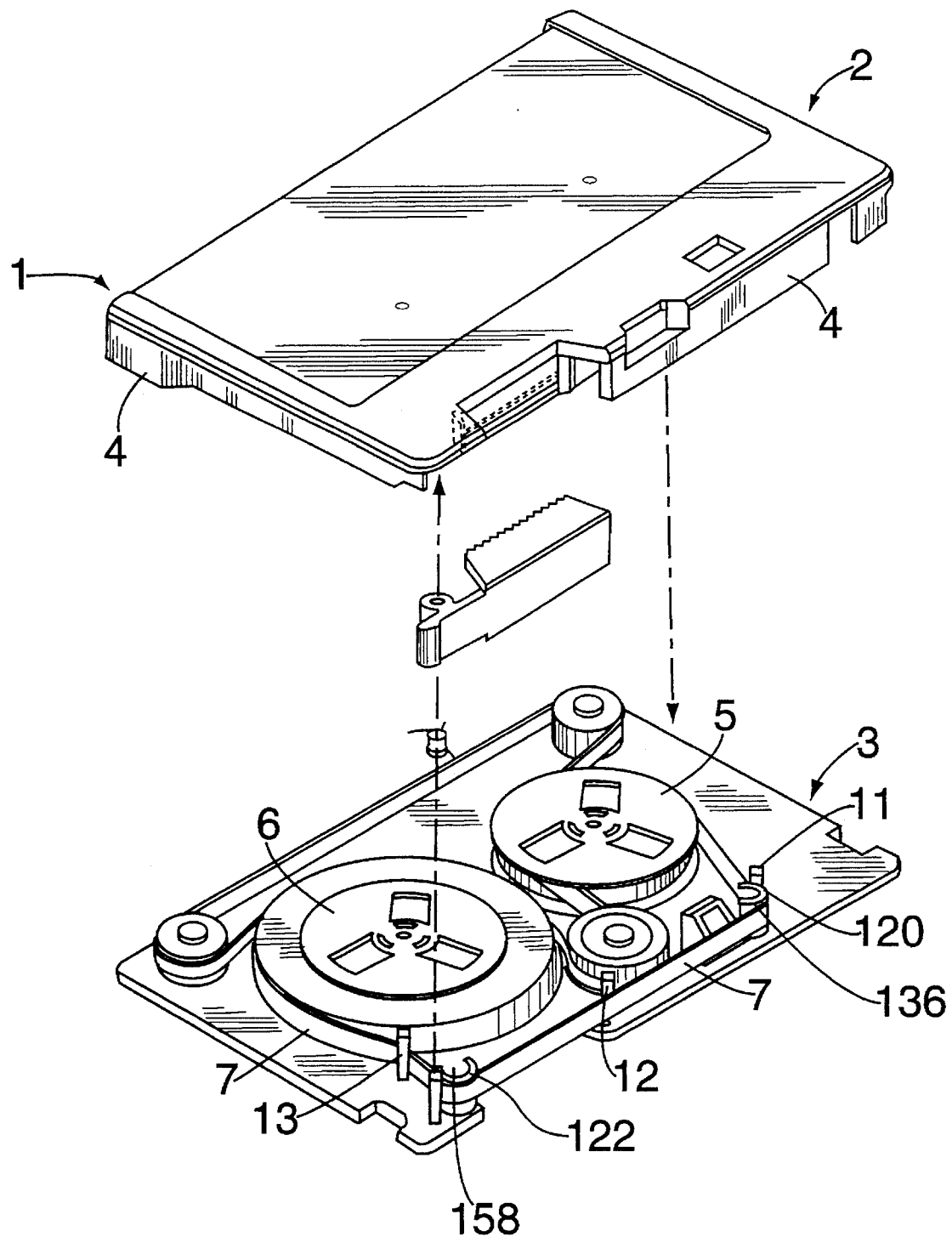
FIG. 4 is an exploded perspective view illustrating a tape cassette of the invention.
Figure 5:
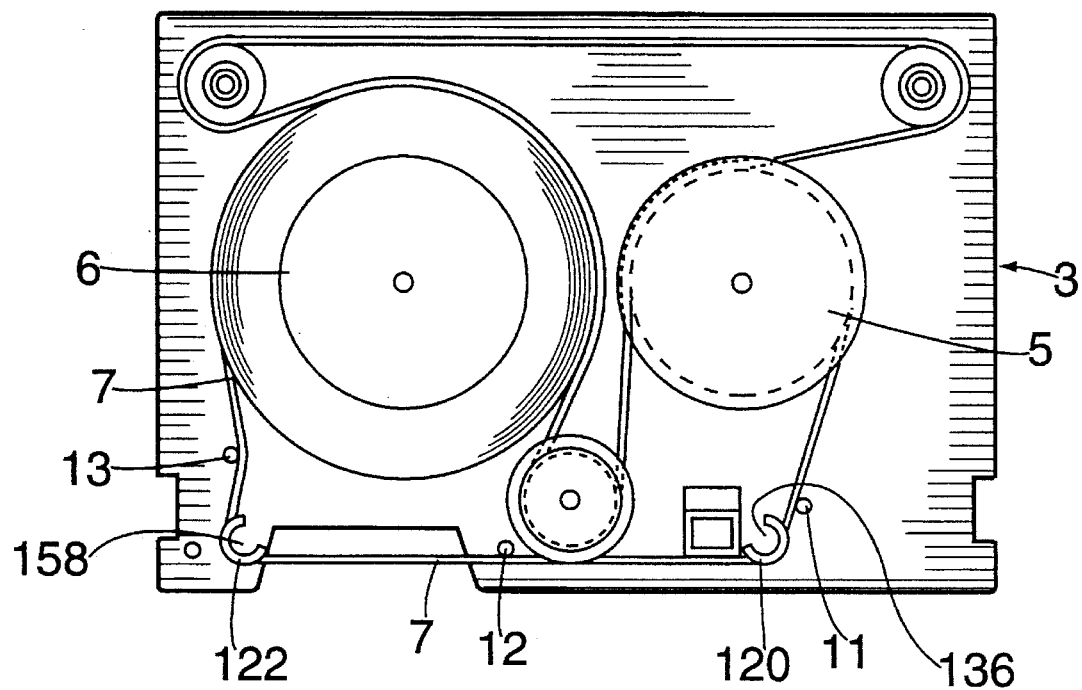
FIG. 5 is a top view of a lower casing of the cassette shown in FIG. 4.

Referring to FIGS. 4 and 5, a tape cassette is shown. The tape cassette includes an upper casing 2 formed of electrical insulating synthetic resin and a flat, lower casing 3 formed of aluminum alloy which together form a cassette casing 1. The upper casing 2 includes a substantially flat, upper wall and a side wall 4 extending downward from the outer perimeter of the upper wall. The casing 1 defines an internal space for rotatably supporting a supply reel 5 and a take-up reel 6, in such a manner that the edge of side wall 4 abuts the outer perimeter of the lower casing 3. It is noted that the tape cassette includes other conventional features which need not be described herein in order to fully describe the invention.

Magnetic tape 7 is wound on the supply 5 and take-up reels 6 through a plurality of upstanding guide pins which are secured in predetermined positions on the lower casing 3. In accordance with the present invention, the tape cassette includes a first guide pin 120 having a first slot 136 and second guide pin 122 having a second slot 158. The first 120 and second 122 guide pins are affixed in predetermined locations in the lower casing 3 and serve to define the tape travel path. As best seen in FIGS. 4 and 5, the first 120 and second 122 guide pins are located near the front face of the casing 1. In addition, the tape cassette includes first 11, second 12 and third 13 guide elements which are located between the supply reel 5 and the first guide pin 120, the first 120 and second 122 guide pins, and the second guide pin 122 and the take-up reel 6, respectively. Tape 7 from the supply reel 5 is drawn over the first guide pin 120 at a predetermined first contact or wrap angle to direct the tape 7 to the front face of the casing 1. When this occurs, the overall diameter of the tape 7 wound on the supply reel 5 changes. The first guide element 11 is positioned adjacent and to the right of the tape 7 so as to maintain the first wrap angle as the overall diameter changes. Typically, the first wrap angle is less than 180°.

Subsequently, the tape 7 travels parallel to and in the vicinity of the front face of the casing 1. The tape 7 is then drawn over the second guide pin 122 at a predetermined second wrap angle to direct the tape 7 toward the take-up reel 6. The third guide element 13 is positioned adjacent to the left of the tape 7 and serves to maintain the second wrap angle as the tape 7 is advanced. Typically, the second wrap angle is greater than 180°.

Figure 6A:
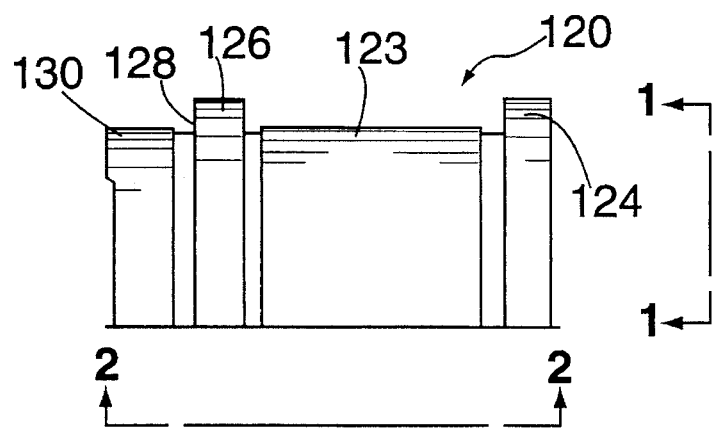
FIG. 6A is a view of a guide pin according to the present invention.

Referring to FIG. 6A, the first guide pin 120 is shown. The first guide pin 120 includes a tape contact section 123 positioned between an upper flange section 124 and a lower flange section 126 having a bottom surface 128. The upper 124 and lower 126 flange sections extend above the tape contact section 123. The tape contact section 123 provides a contact surface upon which the tape 7 passes over as the tape is advanced within the tape cassette. The upper 124 and lower 126 flange sections serve to restrict lateral movement of the tape 7 as the tape 7 passes over the tape contact section 123. The first guide pin 120 further includes a press-fit section 130 extending from the bottom surface 128 of the lower flange section 126.

Figure 6B:
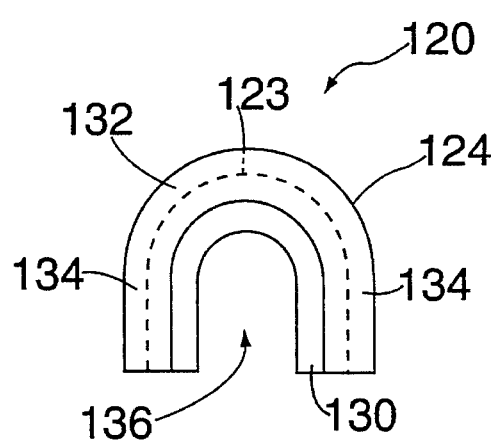
FIG. 6B is a top view of the guide pin along line 1—1 of FIG. 6A.

Referring to FIG. 6B, a side view of the first guide pin 120 along line 1—1 is shown which depicts the upper flange section 124, an inner portion of the press-fit section 130 and the tape contact section 123 (shown as dotted lines). The upper flange section 124 includes a semicircular section 132 having a straight section 134 extending from ends of the semicircular section 132. The first slot 136 is located between each straight section 134 to form a substantially U-shaped configuration. The tape contact section 123, the lower flange section 126 and the press-fit section 130 each include respective semicircular sections and straight sections similar in configuration to the upper flange section 124. In addition, the slot 136 extends through the tape contact section 123, lower flange section 126 and the press-fit section 130. Consequently, the tape contact section 123, lower flange section 126 and the press-fit section 130 are also each U-shaped. As such, the tape contact section 123 provides surface area for accommodating the first wrap angle.

Figure 6C:
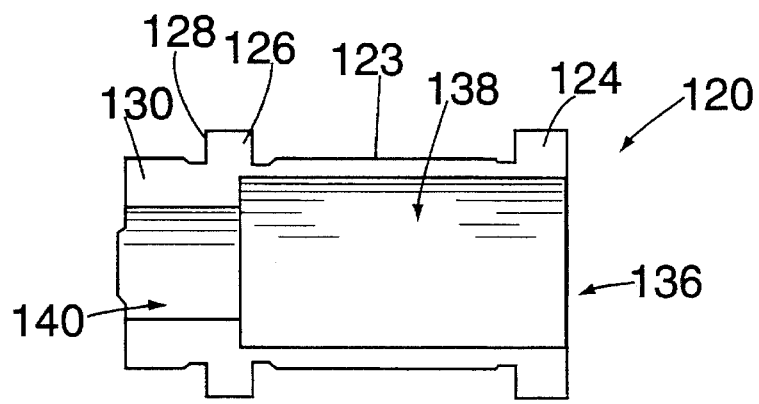
FIG. 6C is a view of the guide pin shown along line 2—2 of FIG. 6A.

Referring to FIG. 6C, a view of the first guide pin 120 along line 2—2 is shown. The slot 136 includes a first aperture section 138 extending through the upper flange section 124, tape contact section 122 and part of the lower flange 126. In addition, the slot 136 includes a second aperture section 140 which is smaller than the first aperture section 138 and which extends through the press-fit section 130.

Figure 7A:
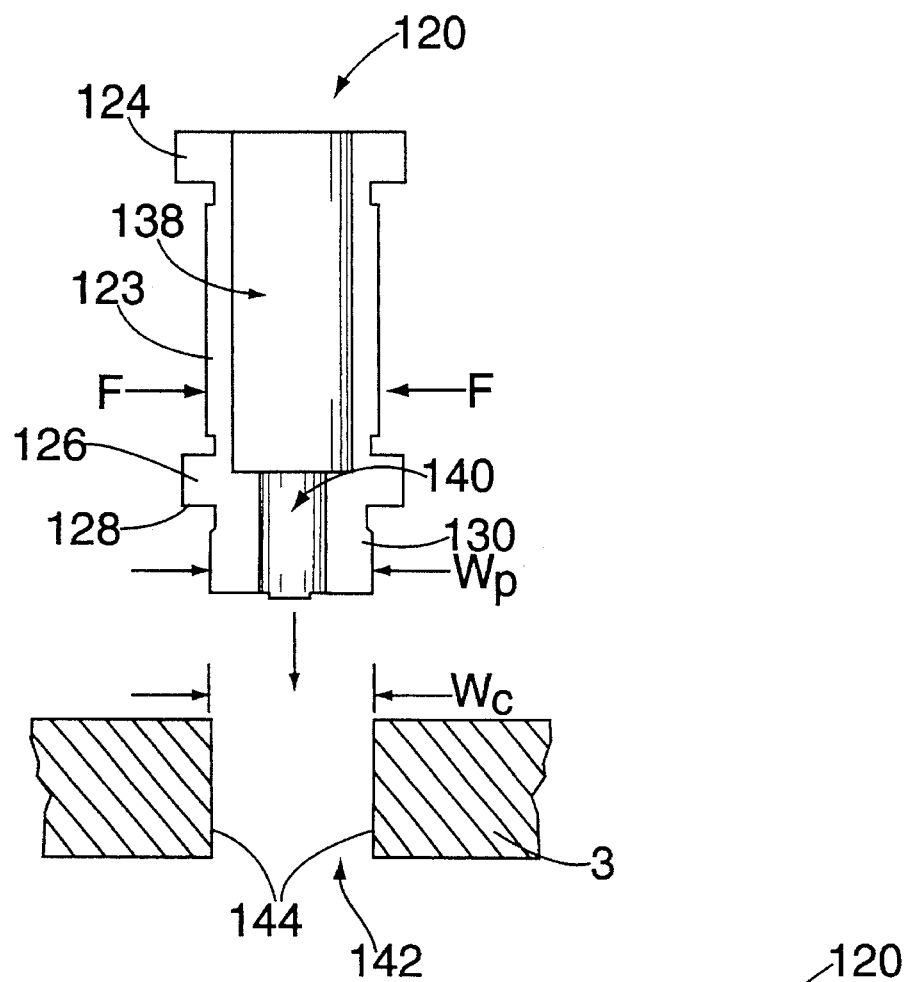
FIG. 7A depicts the guide pin according to the present invention prior to being inserted into the lower casing.

Referring to FIG. 7A, the first guide pin 120 is shown positioned over a portion of the lower casing 3 shown as a partial cross section. The lower casing 3 includes a U-shaped hole 142 having an inner periphery 144 and a hole width $W_C$ for receiving the press-fit section 130. In accordance with the present invention, the first guide pin 120 is fabricated from a resilient material. In a first position, the press-fit section 130 has an overall section width $W_P$ which is larger than hole width $W_C$. In order to insert the press-fit section 130 into the hole 142, opposite forces F are applied to the first guide pin 120. This compresses the first guide pin 120 and the press-fit section 130 and narrows the width of the press fit section 130 such that the width is less than the hole width $W_C$ in a second position. In the second position, the resiliency of the first guide pin 120 biases the press-fit section 130 to move back to the first position.

Figure 7B:
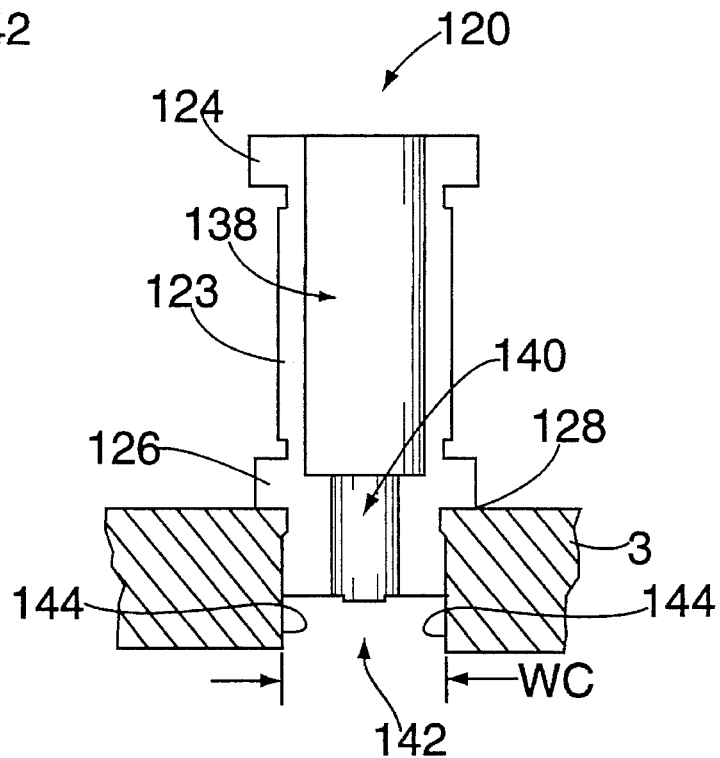
FIG. 7B depicts a press fit section of the guide pin after insertion into the lower casing.

Referring to FIG. 7B, the press-fit section 130 is then inserted into the hole 142 until the bottom surface 128 abuts against lower casing 3, thus orienting the first guide pin 120 in an upright position. Upon release of the first guide pin 120, the resiliency of the press fit section 130 urges the press fit section 130 against the inner periphery 144 of the hole 142. This creates outward pressure against the inner periphery 144 which serves to affix the press-fit section 130 in the hole 142 thus securing the first guide pin 120 to the lower casing 3.

Figure 8A:
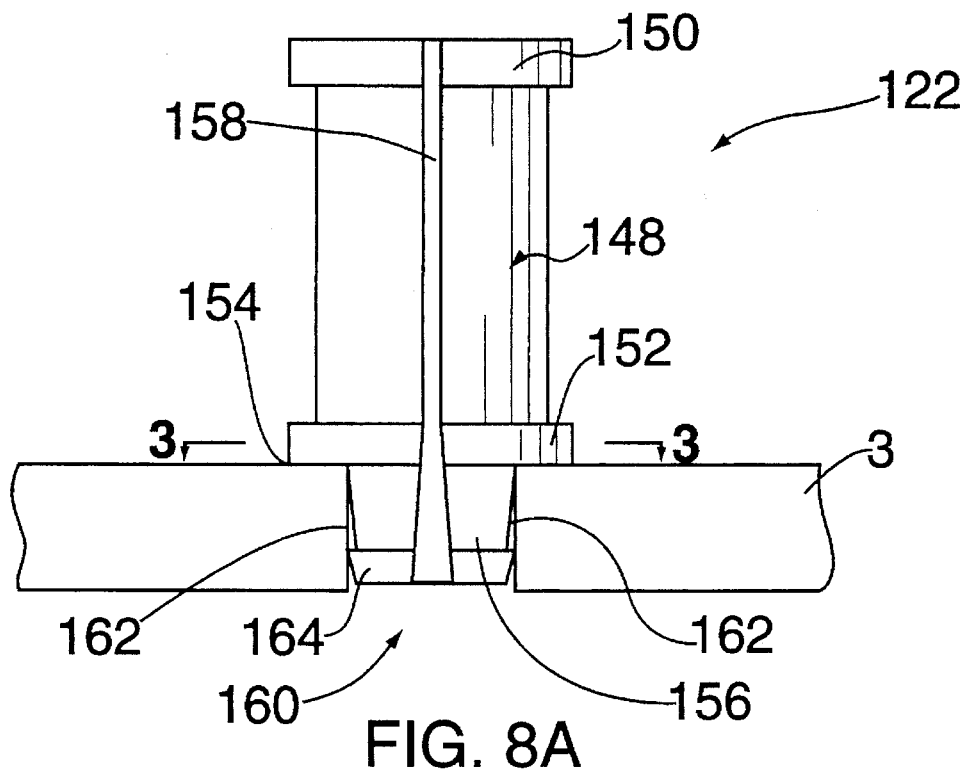
FIG. 8A depicts an alternate embodiment of the guide pin.

Referring to FIG. 8A, the second guide pin 122 is shown affixed to the lower casing 3 having a hole 160 which includes an inner periphery 162. The second guide pin 122 has a C shape and includes a tape contact section 148 positioned between an upper flange section 150 and a lower flange section 152 having a bottom surface 154. The upper 150 and lower 152 flange sections extend above the tape contact section 148. The second guide pin 122 is fabricated from a resilient material and further includes a press-fit section 156 extending from the bottom surface 154 of the lower flange section 152. A grip portion 164 extends from the press-fit section 156 having a frusto conical shape which includes a diameter larger than that of the press-fit section 156. The press-fit section 156 and grip portion 164 are positioned within the hole 160. A slot 158 extends through the upper flange section 150, tape contact section 148, lower flange section 152, press fit section 156 and the grip portion 164. Before insertion into the hole 160, the width of the press-fit section 156 is larger than the hole 160. The second guide pin 122 is then compressed for insertion into the hole 160. Upon insertion into the hole 160, the resiliency of the press-fit section 156 and the grip portion 164 urges the press-fit section 156 and grip portion 164 against the inner periphery 162, thus creating outward pressure against the inner periphery 162 which serves to affix the press-fit section 156 and grip portion 164 in the hole 160 as previously illustrated in the description of FIGS. 7A–7B. The grip portion 164 provides additional grip and outward pressure on the inner periphery 162 in order to more securely affix the second guide pin 122 to the lower casing 3.

Figure 8B:
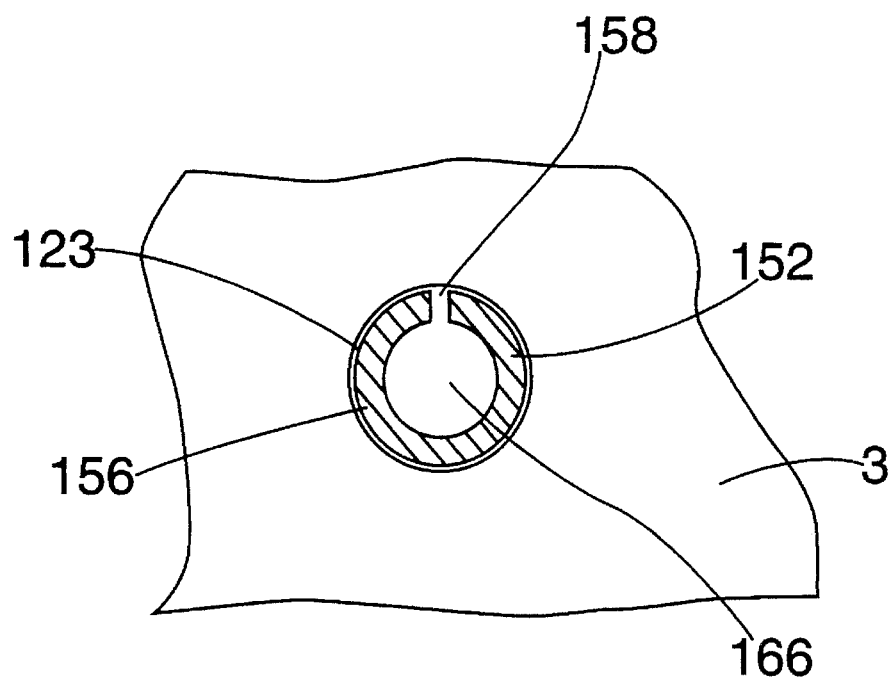
FIG. 8B is a view of the alternate embodiment of the guide pin along line 3—3 of FIG. 8A.

Referring to FIG. 8B, a view of the press fit section 156 and lower casing 3 along section line 3—3 is shown. The press-fit section 156 includes a hollow 166 which extends through the press-fit section 156 to the slot 158 to form a C-shape configuration. In addition, the hollow 156 extends through the lower flange section 152, tape contact section 148 and the upper flange section 150. Consequently, the lower flange section 152, tape contact section 148 and upper flange section 150 are also each C shaped. As such, the tape contact section 123 provides surface area for accommodating the second wrap angle.

Figure 9:
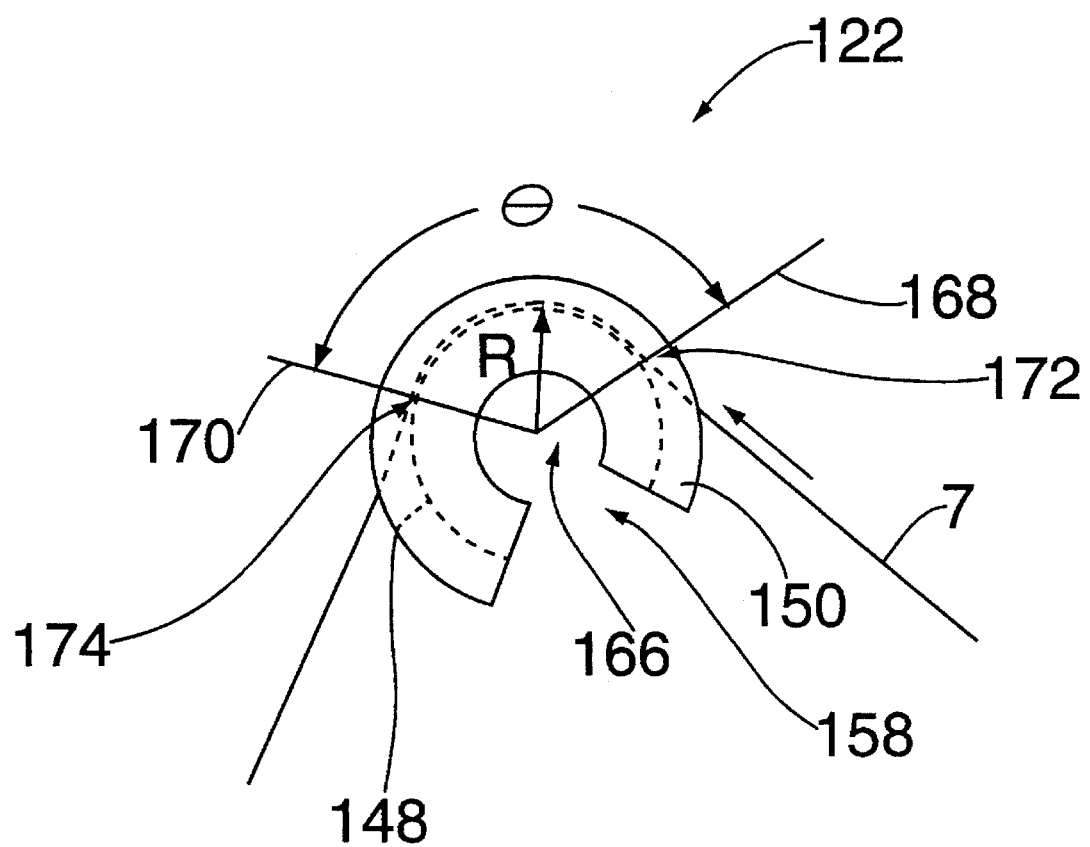
FIG. 9 illustrates the term "wrap angle."

Referring to FIG. 9, the term "wrap angle" as used herein is illustrated. For purposes of illustration, the wrap angle is described in relation to the second guide pin 122 although it is noted that this description is equally applicable in relation to the first guide pin 120. The second guide pin 122 includes a radius R which extends from the center of the second guide pin 122 to the tape contact section 148. As the tape 7 is advanced toward the second guide pin 122 (as indicated by the arrow), the tape 7 makes contact with the tape contact section 148 at an initial point 172. The initial point 172 is denoted by a first line 168, which extends radially outward from the center of the second guide pin 122. The tape 7 then contacts a portion of the tape contact section 148. As the tape 7 is advanced away from the second guide pin 122, the tape 7 is separated from the tape contact section 148 at a final contact point 174. The final contact point 174 is denoted by a second line 170 which extends radially outward from the center of the second guide pin 122. The wrap angle e corresponds to the angle between the first line 168 and the second line 170.

Figure 10:
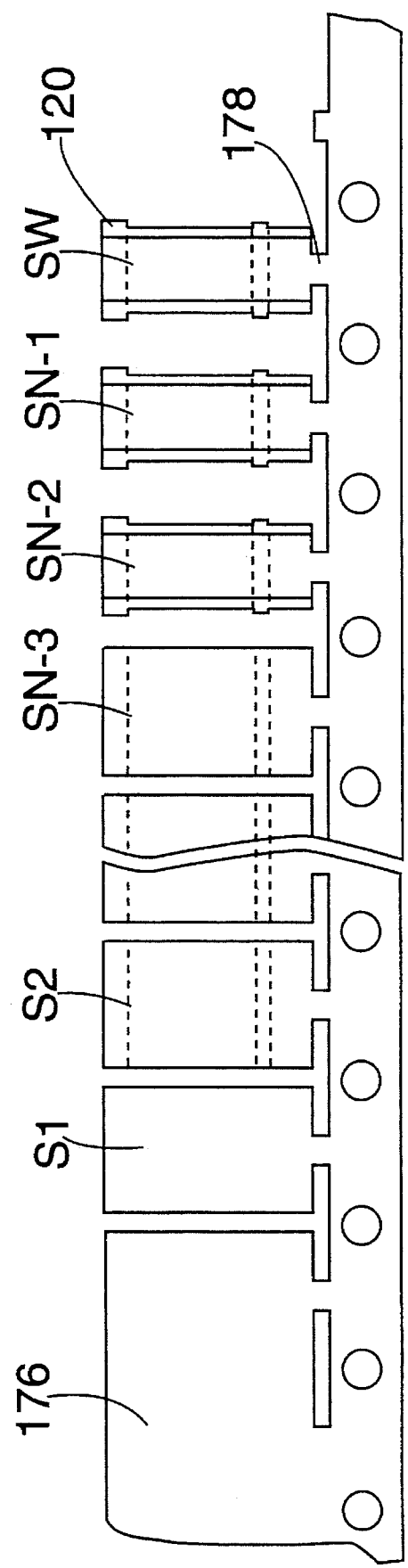
FIG. 10 depicts a process for forming the guide pin in accordance with the present invention.

Referring to FIG. 10, a cold forging process for forming the first guide pin 120 is described. It is noted that this process is equally applicable for forming the second guide pin 122. The first guide pin 120 is preferably made of a non-magnetic material such as stainless steel. In this process, a plurality of sequential stamping operations $S_1$–$S_N$ or steps are performed on a plate 176 to ultimately form a finished first guide pin 120 having a U-shaped configuration at step $S_N$. The first guide pin 120 is then separated at a neck portion 178 from the plate 176 by a blade cutter. The first guide pin 120 is then polished to obtain a substantially smooth finish. In addition, the first guide pin 120 may then be nickel plated to improve durability. As such, the cold forging process results in a pin having a substantially high hardness which can be precisely and inexpensively manufactured.

While the invention has been described in conjunction with specific embodiments, it is evident that many alternatives, modifications, permutations and variations will become apparent to those skilled in the art in light of the foregoing description.

What is claimed is:

1. A guide pin for a tape cassette, said tape cassette having an aperture for receiving said guide pin, said guide pin comprising:

a cylinder having first and second ends and an interior hole extending between said first end and said second end to form a hollow cylinder having a cylinder walk said wall having an outer surface;

first and second flanges extending from said outer surface to divide said outer surface into a tape contact section located between said first flange and said second flange and a press fit section located adjacent said second flange on the opposite side thereof from said first flange; and a slot extending through said wall and between said first end and said second end to form, in a first position, opposed resilient members in said press fit section, wherein upon insertion of said press fit section into said aperture, said opposed resilient members are compressed to a second position and are biased to move toward said first position thus forming a press fit in said aperture for securing said guide pin in said aperture.

2. A tape cassette, comprising:

a cassette casing having at least one aperture;

a plurality of reels for advancing tape between said reels, said reels being rotatably mounted within said casing;

at least one guide pin positioned for guiding said tape to said reels, said guide pin having:

a cylinder including first and second ends and an interior hole extending between said first end and said second end to form a hollow cylinder having a cylinder wall, said wall having an outer surface;

first and second flanges extending from said outer surface to divide said outer surface into a tape contact section located between said first flange and said second flange and a press fit section located adjacent said second flange on the opposite side thereof from said first flange; and a slot extending through said wall and between said first end and said second end to form, in a first position, opposed resilient members having a frusto conical shape in said press fit section, wherein upon insertion of said press fit section into said aperture, said opposed resilient members are compressed to a second position and are biased to move toward said first position thus forming a press fit in said aperture for securing said guide pin in said aperture.

3. The tape cassette according to claim 2, wherein said press fit section is U-shaped.

4. The tape cassette according to claim 2, wherein said press fit section is C-shaped.

5. The tape cassette according to claim 2, wherein tape contacts said tape contact section through an angle of less than 180°.

6. The tape cassette according to claim 2, wherein tape contacts said tape contact section through an angle of greater than 180°.

7. The tape cassette according to claim 2, wherein said press fit section is fabricated from stainless steel.

8. A tape cassette, comprising:

a pair of reels mounted side by side, on which magnetic tape is wound;

a cassette casing for rotatably enclosing said pair of reels therein;

at least one tape guide pin press-fitted through the wall of said casing, said guide pin having a pair of flange sections for defining a tape path for tape travel between the pair of reels, a contact section formed between said pair of flange sections on which a tape contacts said contact section around a wrap angle, said guide pin having a press-fit section press-fitted into a hole in said casing, said guide pin having a hollow extending along a center of said guide pin;

said guide pin further including an opening extending to said hollow and perpendicularly through said flange section, said contact section and said press-fit section of said guide pin at a location outside of said wrap angle, wherein a spring back force of said press-fit section secures a connection between said guide pin and said casing.

9. The improved tape cassette as set forth in claim 8, wherein said guide pin has a U-shaped cross section.

10. The improved tape cassette as set forth in claim 9, wherein said tape contacts said contact section of guide pin around a wrap angle of 180° or less.

11. The improved tape cassette as set forth in claim 8, wherein said guide pin has a C-shaped cross section.

12. The improved tape cassette as set forth in claim 11, wherein said tape contacts said contact section of guide pin around a wrap angle of 180° or more.

13. The improved tape cassette as set forth in claim 8, wherein said guide pin has a hooking portion at the end of said press-fit section around an outer surface thereof, so that said spring back force be applied to said hooking portion for securing to an inner wall of said hole of said casing.

* * * * *